Sept. 12, 1972　　　M. J. LUCKEY　　　3,690,838
APPARATUS FOR UNIVERSAL BLOOD ALCOHOL DETERMINATION
Filed Oct. 19, 1970　　　3 Sheets-Sheet 1
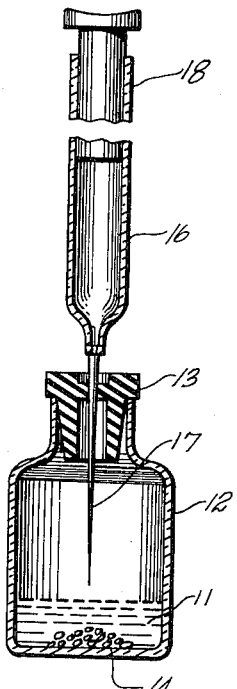
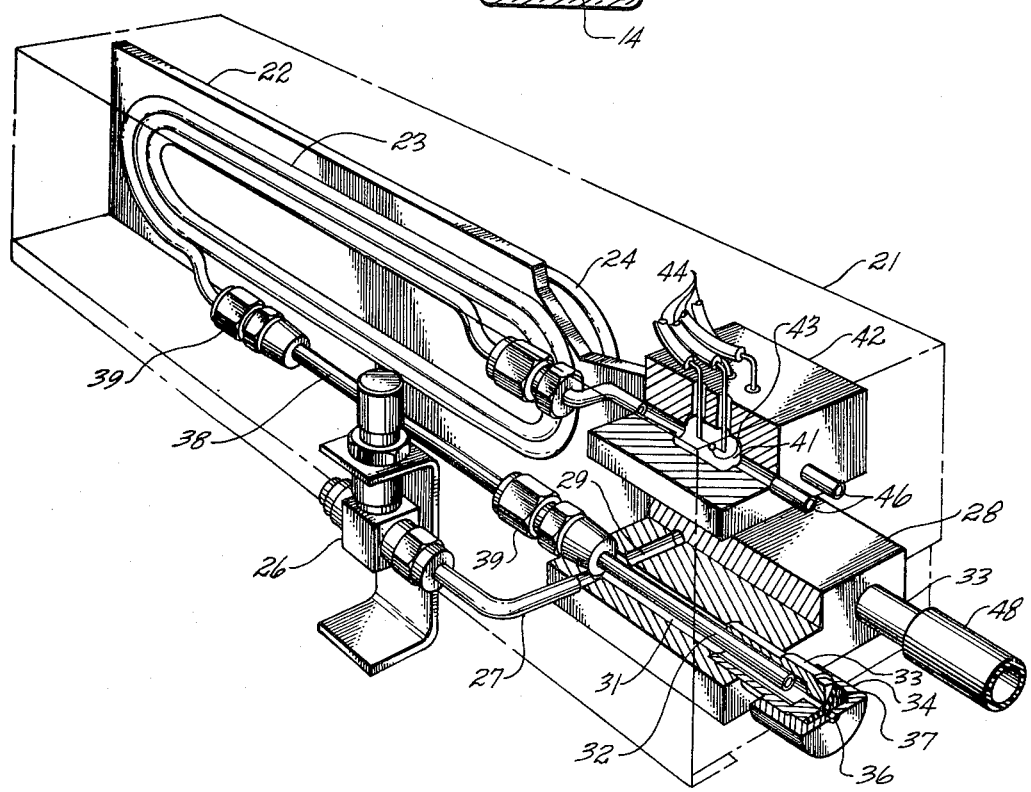
INVENTOR.
MANLEY J. LUCKEY
BY
Christie, Parker, & Hale
ATTORNEYS Sept. 12, 1972   M. J. LUCKEY   3,690,838
APPARATUS FOR UNIVERSAL BLOOD ALCOHOL DETERMINATION
Filed Oct. 19, 1970   3 Sheets-Sheet 2
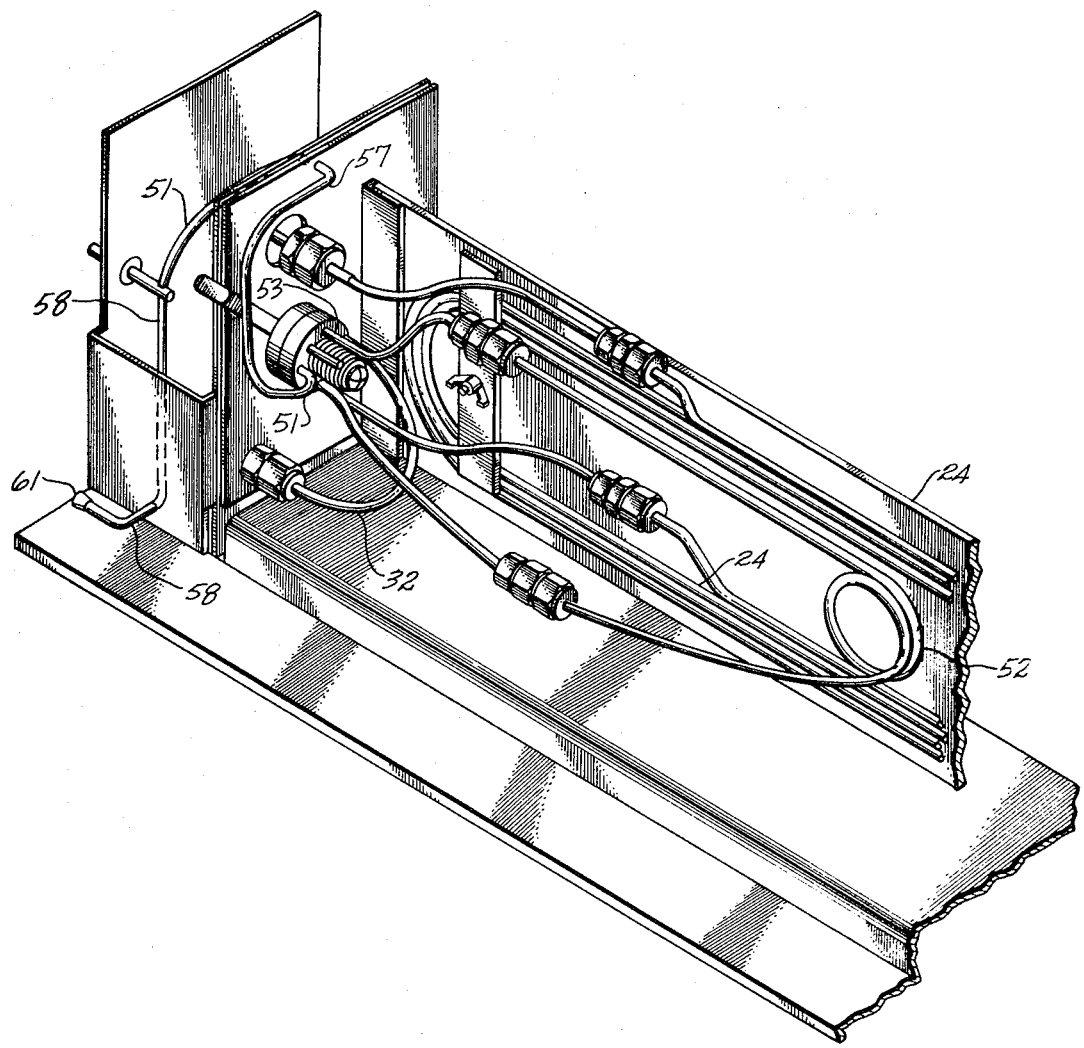
FIG_3

Sept. 12, 1972    M. J. LUCKEY    3,690,838
APPARATUS FOR UNIVERSAL BLOOD ALCOHOL DETERMINATION
Filed Oct. 19, 1970    3 Sheets-Sheet 3
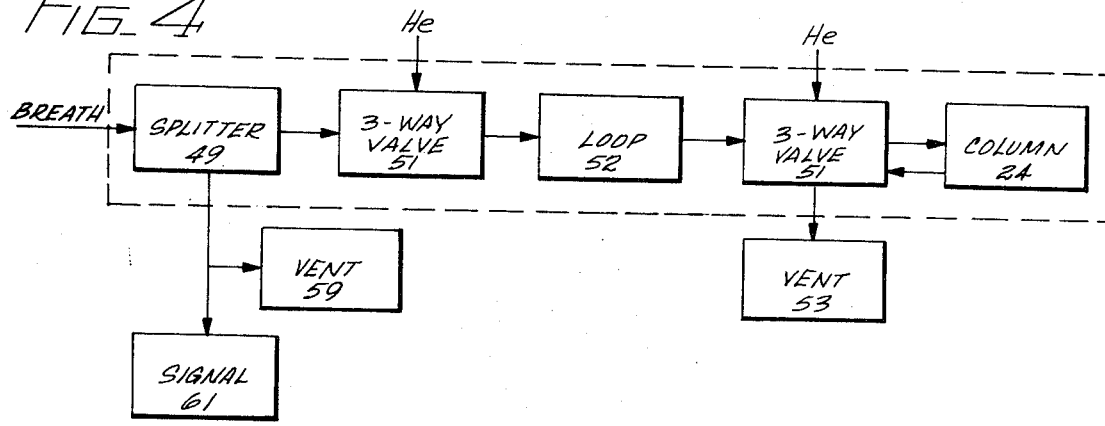
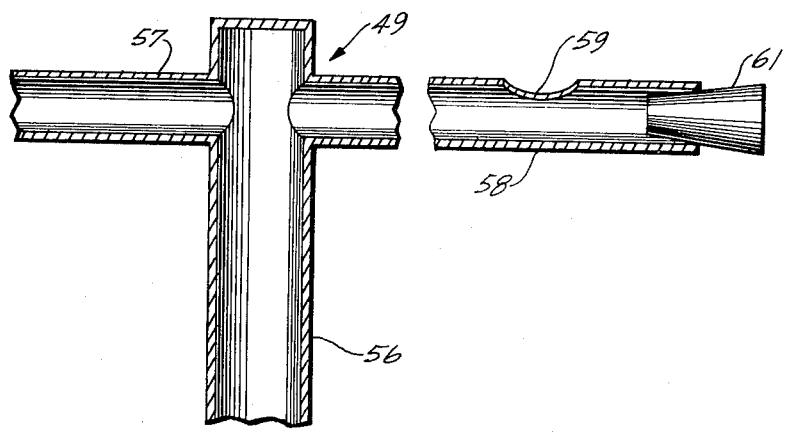
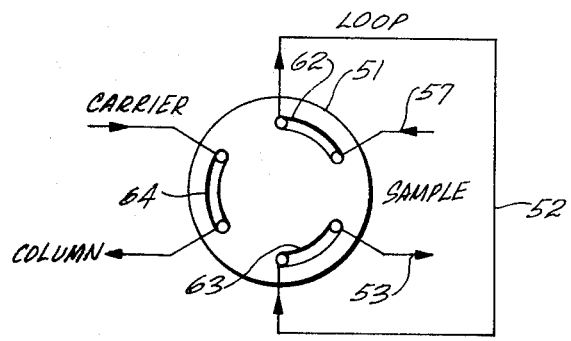
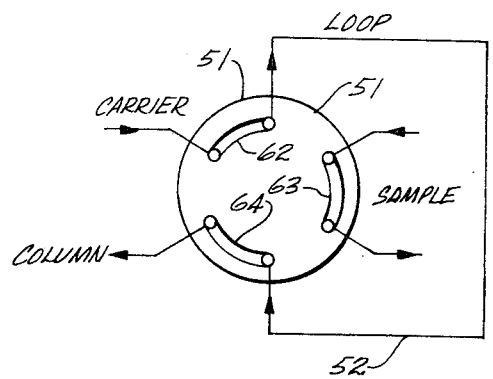

United States Patent Office 3,690,838
Patented Sept. 12, 1972

3,690,838
APPARATUS FOR UNIVERSAL BLOOD
ALCOHOL DETERMINATION
Manley J. Luckey, 7252 Osbun Road,
San Bernardino, Calif. 92404
Filed Oct. 19, 1970, Ser. No. 81,935
Int. Cl. G01n 1/22, 31/08, 33/16
U.S. Cl. 23—254 R
9 Claims

ABSTRACT OF THE DISCLOSURE

A gas chromatograph and method for determination of blood alcohol content from blood samples, urine samples, direct breath samples, or breath extraction samples. Blood or urine samples are analyzed directly in the gas chromatograph, which includes a sample-taking mechanism, including a storage loop for direct breath sampling, and includes an audible signal for assuring that the sample taken is of alveolar breath. A sample of alcohol extracted from breath is dissolved in water and a chromatographic analysis of alcohol vapor concentration in the air over the solution provides a measure of blood alcohol concentration.

BACKGROUND

The determination of the concentration of alcohol in a person's blood has been widely accepted as a measure of the degree of intoxication of an individual for legal purposes. It is extremely important in making blood alcohol determinations to provide precise chemical tests so that the rights of both the individual and the public are protected. A variety of chemical and instrumental techniques have been developed for determining the concentration of alcohol in the blood, and various tests are accepted in different states, with many stages providing the suspected individual with a choice of alternative tests.

One type of test involves a direct determination of alcohol concentration in a sample of blood extracted from the individual. Another technique involves direct determination of alcohol concentration in a person's urine, which correlates with the concentration in the blood. According to still another technique, a sample of a person's breath is analyzed for alcohol content, and this is directly correlated to the alcohol concentration in the blood. According to some variations of the latter technique, the person's breath is applied directly to the apparatus making the concentration determination, and according to other techniques a portion of the person's breath is passed over an extracting medium that has an affinity for alcohol and collects and retains the alcohol in a person's breath. The alcohol is later extracted from this trapping medium and analyzed.

In any of the sampling techniques wherein blood alcohol is determined from the person's breath, it is essential that the breath analyzed be from the last breath exhaled upon deep exhalation. The earliest part of an exhalation is from the tracheal and bronical passages, and this air is not in equilibrium with the blood. The portion of breath in the alveolae deep within the lungs is in equilibrium with the blood and the determination of the alcohol vapor content of this breath is an accurate indication of the alcohol content of the blood. Thus, not only must the chemical determination technique be accurate, but also the sampling technique must be proper to avoid erroneous determinations.

In the past, various chemical techniques have been employed for alcohol determination with different analysis techniques being suitable for different types of samples. Some of the analysis methods are "wet chemical" techniques requiring a substantial amount of technician time to perform the analysis. Some of the techniques are, however, instrumental, which is advantageous since the technician time required is usually minimized. The instrumental techniques available have, however, either been limited to a particular type of sample, that is, blood, urine, or breath, or have required wet chemical techniques to prepare appropriate samples for the instrument.

It is, therefore, highly desirable to provide an instrumental technique for blood alcohol determination easily adaptable for blood, urine or breath samples, either direct or indirect, wherein operator time required is minimized. Such a technique when employed for breath testing should assure that only alveolar breath is sampled.

SUMMARY OF THE INVENTION

Therefore, in practice of this invention, according to a presently preferred embodiment, there is provided a breath sampling technique having means for analyzing breath for alcohol content and means for providing an audible signal indicative of continued exhalation by a person. A gas chromatograph suitable for breath, blood or urine samples is preferably employed as a means for determining alcohol content. A technique for extracting alcohol from an alcohol trapping material and analyzing the resultant extract comprises water extraction of the alcohol and gas chromatographic determination of alcohol vapor content in the air over the resultant water base solution.

DRAWINGS

These and other features and advantages of the invention will be appreciated as the same becomes better understood by reference to the following detailed description of a present preferred embodiment when considered in connection with the accompanying drawings wherein:

FIG. 1 illustrates a sampling technique for liquid samples as provided in practice of this invention;

FIG. 2 illustrates in perspective cutaway a gas chromatograph useful in practice of this invention;

FIG. 3 is another perspective cutaway view of the chromatograph of FIG. 2;

FIG. 4 illustrates in block form a direct breath sampling arrangement;

FIG. 5 illustrates a splitter as provided in the block diagram of FIG. 4; and

FIGS. 6 and 7 illustrate schematically operation of a three-way valve as employed in the arrangement of FIG. 4.

Throughout the drawings like numerals refer to like parts.

DESCRIPTION

As mentioned hereinabove, it is desirable to have an instrumental technique for alcohol determination capable of operating with samples of blood, urine or breath, either directly or indirectly. A gas chromatograph provides such a suitable instrument. Gas chromatography is a technique for separating components of mixtures of volatile compounds. The separations enable one to identify and determine the quantity of each component in a given sample. A key element in a gas chromatograph is the chromatographic column which is conventionally a long tube through which a continual stream of inert gas, called a carrier gas, is passed.

The mixture to be separated and analyzed is introduced at the beginning of the column in the form of a vapor. The carrier gas sweeps the material through the column. The tube forming the column is packed with a material having a large amount of surface area and slightly different affinities for different chemical substances. As the carrier gas sweeps the mixture of substances along the packing material in the column, the flow of different substances is retarded in proportion to the affinity of the packing material for that substance. A composition detector samples the carrier gas as it leaves the column, and if there are different substances in the sample they arrive at the detector at different time intervals.

Conventionally, the detector output is recorded as a function of time and, therefore, each substance in the original sample is represented by a detection peak recorded at a selected time. The area of each peak is proportional to the concentration of that substance in the original sample. The time required for a selected substance to traverse the full length of the chromatographic column is called the retention time. The retention time, as recorded by the gas chromatograph, identifies the substance, and the height of the peak representative of that substance indicates its concentration. Thus, qualitative analysis is obtained by retention time, and quantitative analysis is obtained by peak height.

The gas chromatograph is employed for analysis of volatile compounds that can be put into a gaseous state for passage through the instrument. As pointed out hereinafter, certain liquids can be applied directly to the instrument for volatilization; however, it is preferred for alcohol determination to apply gaseous samples directly to the chromatograph.

FIG. 1 illustrates a sampling technique particularly useful for alcohol determination with a gas chromatograph. As illustrated in this embodiment, a liquid sample 11 is contained in a small bottle 12 enclosed by a conventional rubber puncture top 13. The bottle 12 is not filled with liquid, and an air space or ullage remains above the liquid sample 11. The liquid sample may be either blood or urine to be analyzed for alcohol content, or, as in the illustrated embodiment, may represent a breath sample.

According to one breath sampling technique, a known quantity of a person's breath is passed over a solid material capable of extracting the alcohol from the breath. So-called molecular sieves, silica gel, and magnesium perchlorate are suitable solid materials. The molecular sieve and silica gel adsorb alcohol from the breath and the magnesium perchlorate chemically combines with the alcohol so as to extract it. Such a solid material having trapped alcohol can be placed directly in the bottle 12 in the form of a solid 14, and a measured quantity of water 11 added to extract the alcohol from the solid material. In the case of molecular sieves or silica gel, the water simply displaces the alcohol adsorbed on the solid material and forms a water-alcohol solution. In the case of magnesium perchlorate, the water dissolves the solid an thereby also forms a solution of water containing alcohol.

With any of these types of liquid samples, blood, urine, or water-extracted alcohol, the air in the ullage over the liquid sample very rapidly comes to equilibrium with the sample so that the concentration of water vapor and alcohol vapor in the air reaches a level determined by the vapor pressure of these substances at the temperature of the sample. It might be noted that for accurate determinations of blood alcohol it is important to maintain the temperature of the sample at a known value, preferably at substantially body temperature, which can readily be done with a water bath or the like. It is found that the alcohol vapor concentration in the ullage or head space above the liquid is directly related to the concentration of alcohol in the liquid irrespective of whether the sample is blood, urine, or a water solution containing alcohol extracted from a solid. If the alcohol is present in the liquid at, for example, 0.2% the proportion of alcohol vapor in the air space is constant no matter what the nature of the liquid sample since the solution is basically a water base material and the presence of other substances in the blood, urine or the extracted sample does not significantly affect the vapor pressure of the alcohol over the liquid.

In order to obtain a measurement sample from the liquid sample 11, a conventional syringe 16 having a known volume is employed. The needle 17 of the syringe is passed through the puncture cap 13 preferably with the plunger 18 of the syringe withdrawn by the extent of the sample it is desired to take. Thus, for example, if a two milliliter sample is desired, the plunger 18 is withdrawn two milliliters before the needle 17 is inserted through the stopper 13. After the needle is within the air space above the liquid sample 14, the plunger 18 is depressed to force the air in the syringe into the bottle 12. After only a few seconds to permit re-establishment of equilibrium of concentration of alcohol vapor in the air over the liquid, the plunger is again withdrawn so as to draw a two milliliter sample of air from the bottle into the syringe. The air in the syringe has the same concentration of alcohol vapor as the air above the liquid.

By inserting an equal volume of air prior to withdrawing the sample, the quantity of air within the bottle 12 is not depleted so that multiple samplings of the air can be made if desired. Multiple samplings in any reasonable number are no problem since the quantity of alcohol in the air extracted is minute in comparison to the quantity of alcohol contained in the liquid sample 11, and there is no significant depletion of the alcohol in the sample.

FIGS. 2 and 3 are perspective views of a gas chromatograph used in the practice of this invention. The chromatograph has a housing 21 shown in phantom in FIG. 2 in order to show the internal portions of the apparatus. The housing 21 is merely a sheet metal structure or the like, preferably lined with a thermal insulating material so that the interior can be maintained at a temperature above room temperature for heating the chromatographic columns. A partition 22 along the length of the housing 21 supports a conventional heating element (not shown) for heating the interior of the housing to a temperature above the boiling point of water or at least above the dew point of breath. The partition 22 also provides mechanical support for a pair of chromatographic columns 23 and 24, one on each side of the partition. The columns 23 and 24 each comprise several loops of stainless steel tubing. The tube forming each column is packed with granular molecular sieve grade silica gel for temporarily retaining substances passing through the column.

In order to carry a sample through the chromatographic columns, an inert gas is continuously passed through the column. A flow regulating valve 26 controls the flow of helium, for example, through a tube 27 to the gas chromatograph. The tube 27 enters a sample block 28 that is preferably heated to a slightly higher temperature than the chromatographic columns. A transverse passage 29 through the block 28 carries helium to an identical pair of longitudinal passages 31, one of which is shown in the cutaway view of FIG. 2. The longitudinal passage 31 conducts helium from the transverse passage 29 forwardly in the apparatus in an annular space around a tube 32 concentric with the longitudinal passage. The forward end of the tube 32 is open so that helium can enter and pass into the chromatographic column 23. Thus, flow of carrier gas through the two columns 23 and 24 is proportioned almost completely by the flow resistance of the two chormatographic columns 23 and 24, and since these are stable, there is substantially no change in flow through the two columns during use of the apparatus.

At the forward end of the longitudinal passage 31 is a fitting 33 to which various sample introducing arrangements can be attached. One such sample introducing arrangement is illustrated in cutaway in the nearer column 23, as seen in FIG. 2. As illustrated in this arrangement, a metal cap 34 is mounted on the fitting 33 and the cap has a central aperture 36 through which the needle of a syringe can be inserted. A soft rubber diaphragm 37 is provided inside the cap 34 to close the hole 36 and permit entrance of a syringe needle. Such a needle penetrating the rubber diaphragm enters the inner entry tube 32 so that the sample, when ejected from the syringe, is swept from the tube 32 by the inert gas into the chromatographic column 23.

If the sample is in the form of a vapor contained in the syringe as, for example, may be obtained as a head space sample over the liquid 11 of FIG. 1, the helium sweeps the sample directly into the column. If the sample is a liquid, such as a small quantity of blood or urine, the heated block 28 quickly vaporizes the sample so that the helium sweeps it through the column. Any non-volatile materials at the temperature of the heated block remain in the tube 32 and must eventually be cleaned out.

In between the entry tube 32 and the chromatographic column 23 is a trap 38 in the form of a stainless steel tube packed with glass fibers. The tube is connected in place by conventional fittings 39 so that it can be removed readily without disturbing the chromatographic column. The purpose of the trap 38 is to provide a substantial surface area on which solid materials may collect. Thus, for example, when blood samples are employed, some of the blood proteins are volatilized in the entry tube 32 and are swept by the helium toward the column. Since these are large molecules and may decompose rapidly to non-volatile materials, they tend to permanently collect on the packing material of a chromatographic column. The insertion of a trap 38 having glass wool or the like having a large surface area provides a location for these proteins and other contaminants to collect, thereby protecting the packing in the column 23. The trap 38 is readily removed because of the fittings 39 and is quite inexpensive so that it can be discarded when fouled.

The exit end of the column 23 is connected to an enlarged chamber 41 in a heated block 42, the temperature of which is closely controlled so as to not vary significantly as a function of time. The block 42 has an appreciable heat content so that in the short time intervals involved in making a single determination, there is no substantial temperature change.

A conventional thermistor 43 is mounted in the chamber 41 between a pair of electrical leads 44. The thermistor is a device having a very high rate of change of resistance with varying temperature and is connected by way of the leads 44 to a conventional circuit (not shown) that passes a small circuit through the termistor for heating it somewhat above the ambient temperature of the block 42. In this condition the thermistor 43 very quickly reaches thermal equilbrium and a constant temperature in the slow flow of helium gas. When another substance from a sample injected into the gas chromatograph reaches the chamber 41, the thermal conductivity of the gas in the chamber is different from the conductivity of pure helium and therefore the heat loss from the thermistor changes slightly, causing a slight temperature change. Because of the very large coefficient of resistance change with temperature, a small change in thermal conductivity of gas coming through the column causes a large and readily detected change in resistance of the thermistor. This change in resistance is readily detected by conventional circuits and recorded with a conventional strip chart recorder (not shown). After passing through the detection chamber 41, gases are vented through a vent tube 46. The sensing portion of the chromatographic column 24 is identical to that of the column 23.

In the illustrated arrangement, the second chromatographic column 24 is set up to receive samples of breath directly from a person, and in this arrangement, a plastic tube 48 or other mouthpiece is provided on the fitting 33 leading to the chromtographic column. In this instance, however, the protein trap 38 may be dispensed with since the materials in the breath are volatile and will pass through the column with no appreciable adverse effects.

FIG. 4 illustrates in block diagram form the path of breath in the gas chromatograph. The same elements are also illustrated in FIG. 3. Prior to entering the column 24, the person's breath first enters a splitter 49 from which a portion of the breath passes to a three-way valve 51. This portion of breath then passes through a sample loop 62 back to the three-way valve 51 and then to a vent 53. The sample loop 52 is a fixed volume of stainless steel tubing within the heated portion of the gas chromatograph with the breath entering one end and exiting from the other end. Typically the sample loop has an internal volume of about 10 milliliters.

Since the sample loop 52 is of small diameter, it has a substantial resistance to high velocity flow and a person blowing into the apparatus could not readily pass an entire exhalation in a reasonable period of time without undue fatigue. The splitter 49, which is also illustrated in FIG. 5, provides means for discharging the principal volume of breath and permitting an aliquot to pass through the sample loop 52. In the illustrated embodiment, the splitter comprises a T-shaped tube having a breath inlet 56 with an inside diameter of two units and an exit tube 57 leading to the three-way valve 51 and hence to the loop 52 having an inside diameter of one unit. A side arm 58 on the T has an inside diameter of one unit. Thus, for example, the inlet may have a diameter of about 3/16 inch, the breath exit to the loop 52 and the side arm 58 each have an inside diameter of about 3/32 inch. The side arm 58 has an aperture or vent 59 from which breath is permitted to escape. Also connected to the side arm 59 is an audible signal in the form of a whistle 61. A simple vibrating reed whistle has proved to be adequate.

Thus, when breath is passed into the splitter 49 most of the breath passes through the side arm 58 and out through the vent 59 and a lesser volume passes through the exit 57 and through the sample loop. In this manner, a principal portion of the breath is vented and an aliquot passes through the exit 57 into the sample loop. A small portion of the breath passes through the whistle 61 to provide an audible signal indicative of continued passage of breath through the splitter.

A significant problem with certain conventional breath testing units has been the ability of a person to "cheat" when a breath sample is taken, and deliver a sample off recently breathed air not representative of alveolar air. This, in general, results in an unrealistically low alcohol determination. This problem arises since such breath tester units employ a pressure sensor that lights a light in response to the person's exhaling into the apparatus. When the apparatus operator is not diligent, it is quite possible for the person to hesitate briefly in his breathing and cause the breath sample to be nonalveolar breath. In the illustrated embodiment having an audible signal directly responsive to the flow of a person's breath, the operator need not pay close attention to either the breathing or the lighting of a light since any momentary interruption in the breathing is detected by a change in the sound from the whistle. As a matter of practice, it is sufficient to tell the person taking the test to continue blowing until the whistle stops, and most subjects will blow until their breath is completely exhausted, not immediately recognizing that the whistle will stop only when they stop exhaling.

The breath flow arrangement provided by the three-way valve 51 is further illustrate in the schematic drawings of FIGS. 6 and 7. As illustrated in this arrangement, breath enters the valve by way of the tube 57 and passes through an internal passage 62 into the sample tube 52. Leaving the sample tube 52, the breath passes through a valve passage 63 and thence to the vent 53. When the valve is in the position illustrated in FIG. 6, the carrier gas passes through a valve passage 64 enroute to the chromatographic column.

The internal volume of the sample loop 52 is sufficiently small that a full exhalation of breath has many times the loop volume. Thus, the first breath that is exhaled passes through the sample loop and is displaced by later breath from the same exhalation. This continues until the breath is completed, at which time flow through the loop ceases and the air remaining in the loop is only the last part exhaled, which is necessarily aveolar breath.

After a breath is completed, the valve 51 is switched to the position illustrated in FIG. 7 so that the valve passage 62 is between the carrier gas inlet and the loop 52. The passage 64 is between the exit of the loop 52 and the inlet to the chromatographic column. The carrier gas then passes through the sample loop 52 and carries the sample of aveolar breath contained therein directly to the chromatographic column. Thus, in order to take a breath sample and then transfer the breath sample to the chromatographic column, a simple two-position multi-port valve, as illustrated in FIGS. 6 and 7, is all that is required.

Although limited embodiments of blood alcohol determination have been set forth herein many modifications and variations will be apparent to one skilled in the art. It is therefore to be understood that within the scope of the appended claims the invention may be practiced otherwise than as specifically described.

What is claimed is:

1. A combination comprising:
    means for receiving a sample of breath directly from a person;
    means for analyzing the breath for alcohol content;
    a breath actuated whistle for providing an audible signal indicative of continued exhalation by the person; and
    means for passing at least a portion of the person's breath from the means for receiving to the whistle comprising
        a splitter assembly between the means for receiving and the means for analyzing for continuously passing a first portion of the person's breath to the means for analyzing and for bypassing a second portion of the person's breath to the whistle.

2. A combination as defined in claim 1 wherein the splitter assembly also includes means in parallel flow with the whistle for venting a portion of the person's breath.

3. A combination comprising:
    means for receiving a sample of breath directly from a person;
    a breath actuated whistle for providing an audible signal indicative of continued exhalation by the person; and
    means for continuously passing at least a portion of the person's breath to the whistle and to a
    means for analyzing the breath for alcohol content; said means for analyzing comprising:
        a sample receiving passage having an inlet and an outlet;
        means for connecting the inlet to the means for receiving a sample;
        valve means connected to the outlet for alternatively venting the outlet and connecting the outlet to other portions of the means for analyzing; and wherein
        the sample passage has a sufficiently small volume that alveolar breath substantially completely displaces non-alveolar breath in the sample passage from a single exhalation by the person.

4. A combination as defined in claim 3 wherein the means for analyzing further comprises a gas chromatographic column selectively connectable to the sample passage; and
    means for passing a carrier gas through the sample passage for conveying a sample of breath therein through the gas chromatographic column.

5. A combination as defined in claim 4 wherein the sample passage and the gas chromatographic column are both heated to a temperature above the dew point of breath.

6. A breath sampler comprising:
    an orifice for receiving breath;
    means connected to the orifice for continuously splitting breath flow into first and second streams of preselected ratio;
    means for continuously venting the first stream; and
    means for capturing at least a portion of the second stream.

7. A breath sampler as defined in claim 6 further comprising means connected in parallel with the means for venting for providing an audible signal indicative of continued exhalation.

8. A breath sampler as defined in claim 6 wherein the means for capturing comprises:
    a passage having a volume substantially less than the total volume of breath in the second stream in a single exhalation of a person; and
    means for isolating the passage for capturing a selected portion of the second stream.

9. An apparatus as defined in claim 8 further comprising means for heating the passage and the means for isolating the passage to a temperature above the dew point of a person's breath.

References Cited

UNITED STATES PATENTS

| | | | |
|---|---|---|---|
| 3,476,516 | 11/1969 | Curry | 23—254 R |
| 3,522,009 | 7/1970 | Borkenstein | 23—232 R |
| 3,582,274 | 6/1971 | Keyes | 23—232 R |

MORRIS O. WOLK, Primary Examiner

R. M. REESE, Assistant Examiner

U.S. Cl. X.R.

23—232 R, 255 R; 73—421.5 R; 128—2 C